Dec. 21, 1971
G. E. WALKER
3,629,381
PROCESS FOR MANUFACTURING TOUGH PLASTIC
ARTICLES OF MANUFACTURE
Original Filed July 25, 1967
2 Sheets-Sheet 1
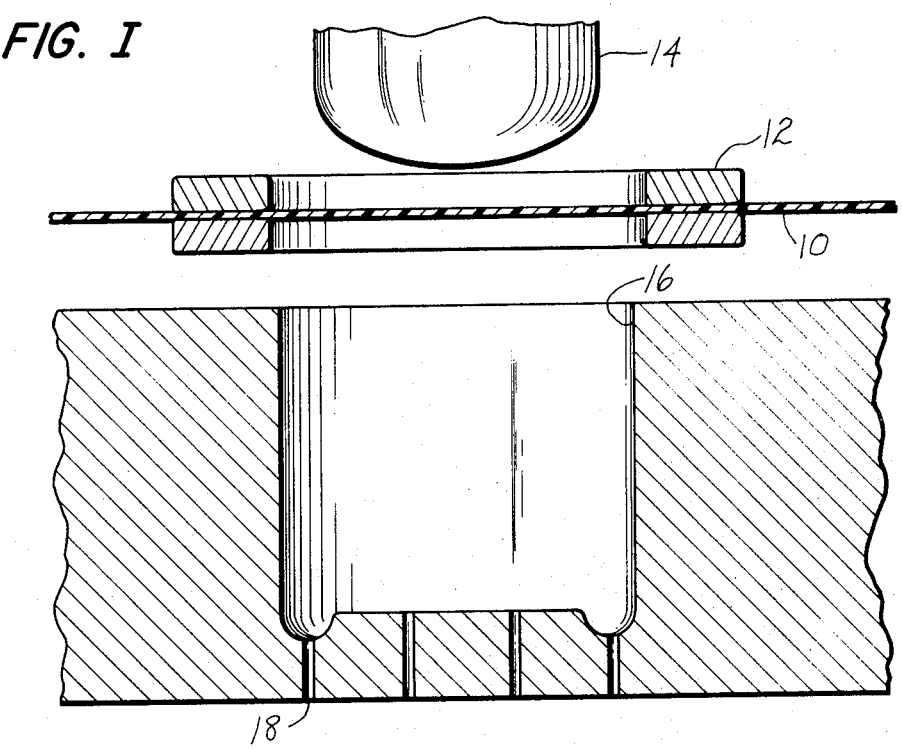
FIG. I
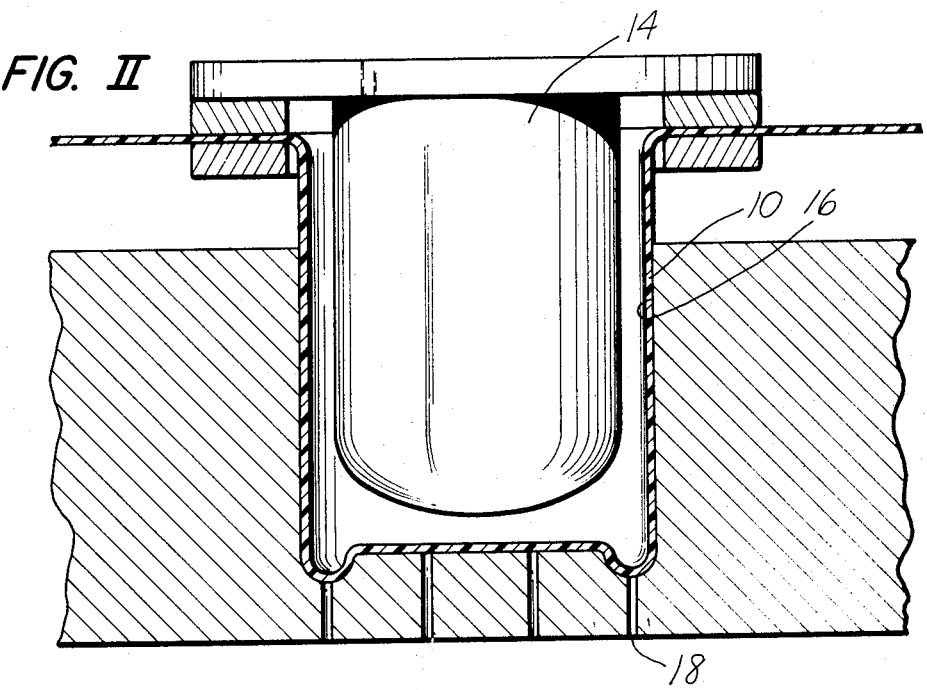
FIG. II
INVENTOR.
GEORGE E. WALKER
BY James C. Logomasini
ATTORNEY:

Dec. 21, 1971  G. E. WALKER  3,629,381
PROCESS FOR MANUFACTURING TOUGH PLASTIC
ARTICLES OF MANUFACTURE
Original Filed July 25, 1967  2 Sheets-Sheet 2
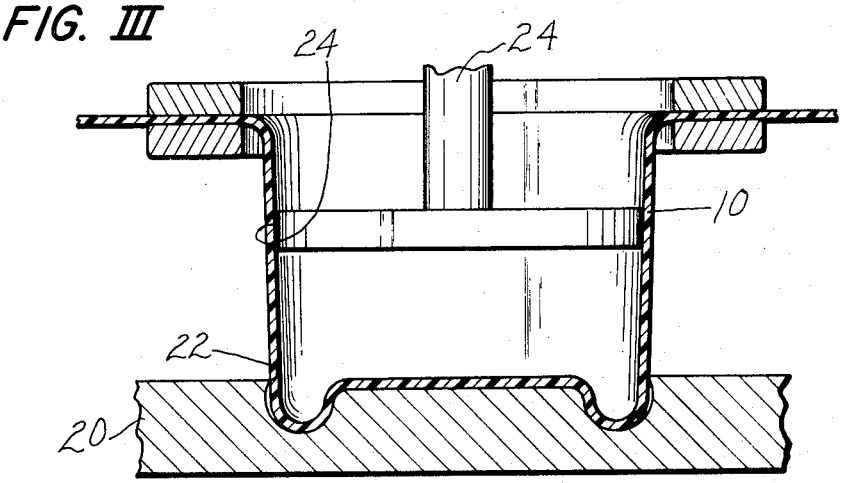
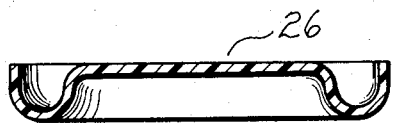
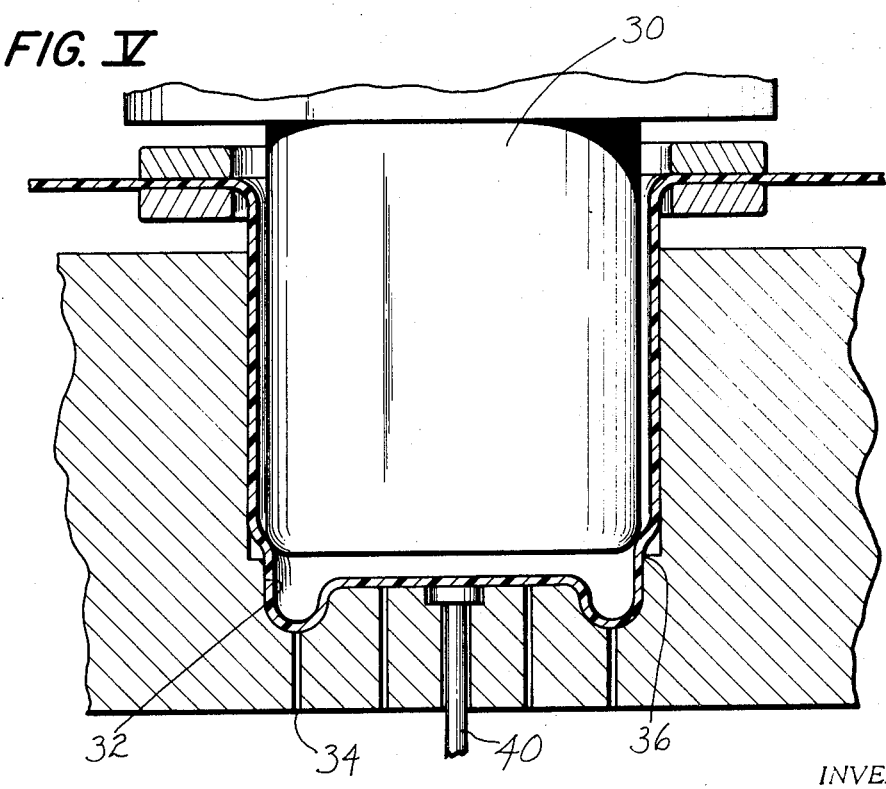
INVENTOR.
GEORGE E. WALKER
BY
*James C. Logomasini*
ATTORNEY.

_United States Patent Office_

3,629,381
Patented Dec. 21, 1971

3,629,381
PROCESS FOR MANUFACTURING TOUGH PLASTIC ARTICLES OF MANUFACTURE
George E. Walker, Longmeadow, Mass., assignor to Monsanto Company, St. Louis, Mo.
Continuation of application Ser. No. 655,827, July 25, 1967. This appplication Oct. 22, 1969, Ser. No. 868,649
Int. Cl. B29c 17/04, 17/08
U.S. Cl. 264—92                                    5 Claims

ABSTRACT OF THE DISCLOSURE

A method for forming plastic articles having improved structural properties. A portion of a thermoplastic sheet is clamped about its periphery and the clamped portion brought to a temperature at which it can be oriented. The sheet portion is then drawn axially into a mold cavity and radially outwardly against the surface of the cavity so as to stretch and orient the sheet. The drawn material is then severed below at least one-half the total draw between an edge peripherally surrounding the drawn material and the side of a plunger advancing in the direction of the axial draw so as to form an oriented article from the portion of the drawn material below the edge. The axial draw may be carried out using the same plunger used to sever the material. A differential pressure may also be used to effect the radial draw.

This application is a continuation of copending application Ser. No. 655,827, filed July 25, 1967, now abandoned.

The present invention relates to a method of forming an unusually tough synthetic plastic article.

Major advances have been made in the thermoforming of plastic articles such as plastic containers. Plastic containers are available having thin tough walls suitable for containing coffee, cokes and other condiments. Unfortunately, the development of suitable closures and lids for the containers has not proceeded as rapidly and consequently there are major problems which must be resolved. For example, it is generally known that many thin-walled lids currently being utilized to cap liquid holding containers have a tendency to crack and are not sufficiently strong to permit stacking of the filled containers for any extended period of time. The problem is particularly severe when the contained ingredients have a chemical or corrosive effect on the plastic closure. In such instances, the lids of filled and closed containers placed in stacked relationship have been known to rupture over a period of time due to the combination of stacking pressure and the corrosive effect of the material within the container. This effect has severely limited the use of the more economical grades of plastic material which must be used to produce an economical and therefore competitive package. It has now been found that an extremely tough and corrosive resistant economical plastic article such as a closure can be produced by utilizing special materials in combination with a special thermoforming method.

It is an object of the present invention to provide method for forming plastic articles having improved structural properties.

It is another object of the present invention to provide method for forming extremely tough plastic closures and/or lids.

It is another object of the present invention to provide method for forming closures and/or lids of plastic material having improved toughness and corrosive resistance.

Other objects of this invention will in part be obvious and will in part appear hereinafter.

These and other objects are attained by rendering a sheet of orientable thermoplastic material malleable, drawing at least a part of the sheet into a mold cavity and severing the drawn material below at least one-half of the total draw to form the tough plastic article.

The following drawings are provided for illustration of the various embodiments of the present invention.

FIG. I is a vertical section view of a mold cavity and plunger with an intermediately clamped sheet.

FIG. II is a view similar to FIG. I showing the plunger in fully drawn position.

FIG. III illustrates the molded form after it has been withdrawn from the mold shown in FIGS. I and II.

FIG. IV illustrates the lid after it has been severed from the molded form of FIG. III.

FIG. V is a vertical section view of an alternate embodiment of a cavity and plunger molding device.

Referring in detail to the drawings and more specifically, FIG. I, there is schematically shown a sheet of plastic material 10 held within clamping ring 12 and which has been heated to a moldable temperature. Above the sheet is a plunger 14 axially aligned over cavity 16. At the bottom of cavity 16 are ports 18 to permit air exhaust. FIG. II illustrates the mold of FIG. I in fully drawn position, i.e., the plunger 14 has engaged the sheet 10 drawing a portion of the sheet into cavity 16. A vacuum applied inside the cavity through ports 18 by vacuum creating means not shown causes the sheet 10 to draw tightly against the walls of the cavity 16.

In FIG. III the drawn sheet 10 is shown after it has been removed from the cavity 16 of FIG. II and placed in a cutting die 20. The cutting die has a sharp peripheral edge 22 which contacts the lower portion of the molded sheet 10. When the plunger 24, supported by means not shown above the cutting die, is brought down into the cutting die, the molded sheet 10 is pinched between the peripheral edge 22 of the cutting die 20 and the side of the plunger 24 resulting in a severance of the lowermost part of the molded sheet forming the lid 26 illustrated in FIG. IV. FIG. V illustrates an alternate embodiment of the present invention wherein the molded form is produced and the bottom portion severed in one molding operation. More specifically, the sheet is partially drawn into the mold by the action of plunger 30 and drawn against the cavity wall 32 by means of a vacuum applied through ports 34 similar to that described in FIGS. I and II. In this embodiment, however, the cavity is provided with a circumferentially extending internal step 36 at the lower part of the cavity wall 32. In this particular embodiment the plunger does not travel initially its full distance when the sheet is initially drawn and applied against the wall of the cavity 32. However, after the sheet has been applied against the wall 32 and has cooled sufficiently to stabilize its form, or in other words to a temperature which is below the malleable temperature of the sheet, plunger 30 is further advanced into the cavity to pinch and thereby sever the lower portion of the molded form from the sharp edge of internal step 36. The severed sheet is then withdrawn from the mold and the finished lid at the bottom of the cavity is ejected by means of ejection pin 40 and a positive air pressure applied through passageways or ports 34. In this manner, the lid is formed in one molding operation.

The above description and particularly the drawings are set forth for the purpose of illustration only and not for the purpose of limitation.

The sheet material from which the article is formed may be of any orientable thermoplastic material which can be molded to produce an article of the type described. Suitable resins which may be used are polystyrene, styrene-acrylonitrile, acrylonitrile - butadiene - styrene, polypropylene, polyethylene, polycarbonate, polyacrylate, polymethacrylate, polyvinyl chloride, polyterephthalate, polyamide, polyesters and the like including copolymers and interpolymers thereof. Preferred polymers with which particularly unusual good results have been obtained are polystyrene and polymers containing at least 30% by weight of polymerized styrene monomer with the remmaining materials being thermoplastic polymers blended or interpolymerized with the styrene polymer.

As can be readily appreciated, the present invention provides a unique way of producing economical plastic articles from thermoplastic materials which are tough and crack resistant and can withstand rigorous handling. The following examples are given to illustrate the invention more clearly and are not intended as a limitation thereof. Unless otherwise specified, quantities mentioned are on a weight basis.

EXAMPLE I

A polystyrene homopolymer (average Staudinger molecular weight equals 51,000) is shaped by extrusion into the form of a sheet 20 mils thick. Three sections are severed from the extruded sheet and each sheet section clamped between a six inch I.D. clamping ring such as shown in FIG. I. Each clamped section is then heated to a temperature of 260° F. and the sheet is then shaped as previously described with reference to FIGS. I and II. More specifically, a plunger having a diameter of 2.5 inches contacts approximately the center of the clamped and heated sheet and draws that portion of the sheet approximately 3 inches into a round flat bottom 3 inch diameter die cavity. A positive air pressure of approximately 80 p.s.i. is applied on the plunger side of the sheet causing the sheet to assume the internal dimensions of the cavity. The shaped thermoplastic form is then cooled and withdrawn from the cavity and severed circumferentially in a separate operation as illustrated in FIG. III about ½ inch up from the bottom of the shaped thermoplastic form.

The three inch diameter lid that is produced by the process described in the preceding paragraph is then subjected to the Mullens Burst Strength Test (ASTM D774–46) which involves subjecting a unit portion of a sample to increasing loads or pressure until rupture. The results are tabulated in Table I. In addition to subjecting the samples to the Mullens Burst Strength Test (results tabulated in Table I) some of the samples are subjected to the "Hot Soup" Test. The "Hot Soup" Test is carried out by filling a container with hot (212° F.) aggressive environment (in this instance 3% by volume Mazola oil mixed with water) and clamped with the sample lid. A second container with a circular bottom having a diameter of 2.5 inches is filled to weight of ½ lb. and placed on top of the sample lid of the first container and left in this position until the lid ruptures. In essence, this test measures how long it takes the aggressive environment within the first or test container to embrittle the lid causing the top container to punch through the lid. The results are tabulated in Table II.

EXAMPLE II

The procedure of Example I is repeated except that high impact polystyrene polymer is employed (polybutadiene rubber content equal to 5%) in place of the polystyrene homopolymer of Example I. The results are also tabulated in Tables I and II.

EXAMPLE III

The procedure of Example II is repeated except that a styrene-acrylonitrile copolymer (3 parts styrene-1 part acrylonitrile) is employed in place of the high impact polystyrene polymer of Example II. The results of the Mullens Burst Strength Test are tabulated in Table I.

EXAMPLE IV

The procedure of Example II is repeated except that acrylonitrile - butadiene-styrene (the styrene-acrylonitrile of Example III with butadiene rubber content equal to 7.5%) is employed in place of the high impact polystyrene polymer of Example II. The results of the Mullens Burst Strength Test are tabulated in Table I.

TABLE I

| Material | Sample sheet thickness, inches | Mullens burst strength test, lbs./sq. in. | |
|---|---|---|---|
| | | Control [1] | Sample produced in each example |
| Polystyrene homopolymer (Example I) | 0.020 | 35 | 95 |
| Rubber-modified polystyrene (Example II) | 0.020 | 140 | 200 |
| Styrene-acrylonitrile (Example III) | 0.020 | 45 | 205 |
| Styrene-acrylonitrile-butadiene (Example IV) | 0.020 | 185 | 250 |

[1] The control samples comprise sheet material of approximately the same width and approximtely the same size as those produced in the examples except that they are not subjected to the forming process described in the examples, but rather are shallow formed.

TABLE II.—HOT SOUP TEST

| Material | Sample sheet thickness, inches | Control | Sample produced in each example |
|---|---|---|---|
| Polystyrene homopolymer (Example I) | 0.020 | Failed after 20 sec. | No fail after 1 hr. |
| Rubber-modified polystyrene (Example II) | 0.020 | ----do---- | Do. |

As is apparent from Table I and Table II, the samples produced using the special procedure of Examples I–IV were substantially superior in terms of the Mullens Burst Strength Test and the Hot Soup Test over the control samples which had not been subjected to the drawing process of this invention.

As previously indicated, a thermoplastic sheet is heated to a malleable condition and drawn into an extended hollow shape. The article is produced by severing the bottom portion from the drawn hollow shape below at least one-half of the total draw thereby providing an extremely tough, corrosive resistant plastic article. To obtain overall enhanced properties of toughness and durability, the drawn plastic should be severed at a point more than at least one-half of the total draw measured from the point the drawing is initiated. The article formed may be of varied shapes such as circular, square, rectangular, conical and the like. For optimum results, the depth of draw should be 0.2 to 3 times the shortest crosswise dimension.

In the operation of the illustrated apparatus to form the article, an orientable thermoplastic sheet is clamped and heated to a moldable temperature. The temperature employed should be sufficiently below the molten temperature of the thermoplastic material to insure substantial orientation of the plastic as the lid is formed. On the other hand, the temperature should be sufficiently high to render the sheet sufficiently malleable to properly shape the article and to avoid brittle failure in the molding clamp.

The extent of toughness and corrosive resistance attained during the drawing operation is dependent on several factors such as the condition of the sheet prior to stretching, the temperature of the sheet during the drawing operation, the extent and the location of stretch, and their related factors such as plunger travel, the shape of the plunger, etc. In general, lower temperatures and increased stretching tend to increase these properties.

As illustrated, the molding and subsequent severing of the article from the lower portion of the drawn sheet can be accomplished in separate operations or in separate steps within the same operation by providing a cutting edge in the molding cavity. After severing any suitable means can be used to eject the finished article from the bottom of the cavity; for example, ejector pins, pressure devices and the like. Although a fair amount of scrap material may be generated, the enhanced properties of the formed article will in general outweigh this disadvantage where the need for an extremely tough and enduring article exists. Furthermore, the bulk of the scrap material can be reworked to substantially minimize the cost of manufacture.

As can be readily appreciated, the present invention provides a unique way of producing an extremely tough and corrosive resistant article from thermoplastic materials which are usually crack resistant and which can withstand rigorous handling and stacking. Examples of articles that can be produced with the featured process include closures, i.e., lids, lenses, trays and the like.

The above description and particularly the drawings are set forth for purposes of illustration only. Many variations and modifications thereof will be obvious to those skilled in the art and can be made without departing from the spirit and scope of this invention as hereinafter claimed.

What is claimed is:

1. The process for manufacturing a tough, shallow thermoplastic article of manufacture which comprises the steps of bringing the temperature of a thermoplastic sheet to one at which the thermoplastic can be molecularly oriented, drawing at least a portion of said sheet in an axial direction into a mold cavity and radially outwardly against the surface of said cavity to stretch, molecularly orient and thereby increase the strength of the sheet portion and pinching the axially and radially drawn material below at least one-half of the total draw between an edge peripherally surrounding the drawn material and the side of a plunger advancing in the direction of the axial draw to sever the drawn material at the edge, thereby forming the article from the portion of the drawn material below the edge.

2. The process according to claim 1 wherein the thermoplastic sheet contains at least 30% by weight of polymerized styrene monomer.

3. The process for manufacturing a tough, shallow, thermoplastic form which comprises the steps of clamping a portion of an orientable thermoplastic sheet about its periphery, bringing the temperature of said sheet portion to one at which the thermoplastic can be molecularly oriented, drawing the portion of said sheet in an axial direction deeply into a mold cavity a distance of 0.2 to 3 times the shortest crosswise dimension of the cavity and radially outwardly against the surface of the cavity to stretch, molecularly orient and thereby increase the strength of the sheet portion, cooling the drawn portion below its malleable temperature and pinching the axially and radially drawn material below at least one-half of the total draw between an edge peripherally surrounding the drawn material and the side of a plunger advancing in the axial direction of the draw to sever the drawn material at the edge thereby forming the thermoplastic form from the portion of the drawn material below the edge.

4. The process of claim 3 wherein drawing includes contact with a surface advancing into the cavity.

5. The process for manufacturing a trough, shallow article of manufacture from a portion of an orientable thermoplastic sheet clamped about its periphery which comprises bringing the temperature of said portion to one at which the thermoplastic can be molecularly oriented, advancing a plunger against said sheet portion to partially draw said portion axially into a mold cavity, imposing a differential pressure on said drawn sheet portion to axially and radially expand a section of said drawn sheet portion beyond a circumferentially extending edge in the lower portion of the mold cavity and against a cooled article defining surface portion of said mold cavity, said expanding serving to stretch, molecularly orient and thereby increase the strength of the sheet section forming said article, and advancing said plunger further into said cavity to sever the article from the remainder of the sheet between the edge and the surface of the plunger.

References Cited

UNITED STATES PATENTS

| | | | |
|---|---|---|---|
| 3,184,524 | 5/1965 | Whiteford | 264—94 |
| 3,214,830 | 11/1965 | Piker | 264—152 X |
| 3,259,942 | 7/1966 | Politis | 264—94 UX |
| 3,291,874 | 12/1966 | Negoro | 264—89 |
| 3,310,620 | 3/1967 | Martelli et al. | 264—163 X |

FOREIGN PATENTS

| | | | |
|---|---|---|---|
| 1,406,520 | 6/1965 | France | 264—97 |

ROBERT F. WHITE, Primary Examiner

J. H. SILBAUGH, Assistant Examiner

U.S. Cl. X.R.

264—98, 153, 163, 322